L. A. HART.
PLANT SPRAYING MACHINE.
APPLICATION FILED AUG. 8, 1914.
1,158,209.
Patented Oct. 26, 1915.
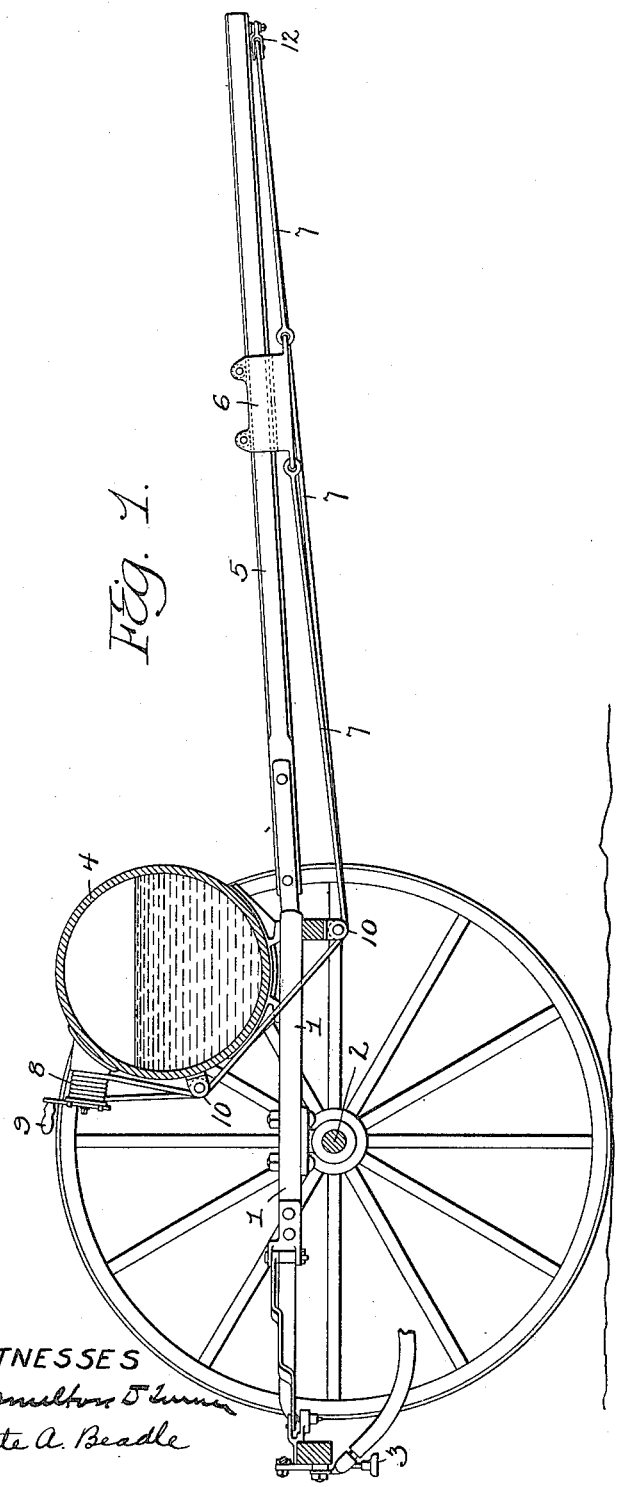
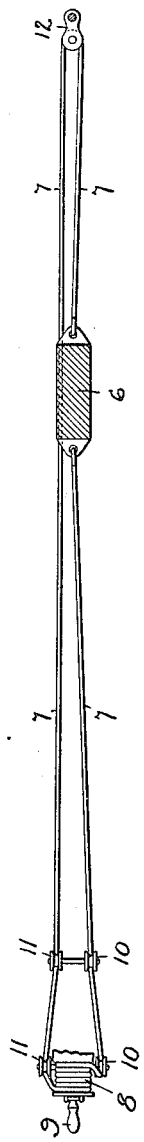
WITNESSES
Hamilton D Lunn
Kate A. Beadle
INVENTOR
LEWIS ALBERT HART
BY HIS ATTORNEY
Harry Smith

UNITED STATES PATENT OFFICE.

LEWIS ALBERT HART, OF BINGHAMTON, NEW YORK, ASSIGNOR TO BATEMAN MANUFACTURING COMPANY, OF GRENLOCH, NEW JERSEY, A CORPORATION OF NEW JERSEY.

PLANT-SPRAYING MACHINE.

1,158,209.   Specification of Letters Patent.   Patented Oct. 26, 1915.

Application filed August 8, 1914. Serial No. 855,770.

*To all whom it may concern:*

Be it known that I, LEWIS ALBERT HART, citizen of the United States, residing in Binghamton, New York, have invented certain Improvements in Plant-Spraying Machines, of which the following is a specification.

My invention relates to that class of spraying machines having a frame mounted upon two wheels, with the spraying devices in the rear of the axle and the tank for the spraying solution in advance of the same, the object of my invention being to prevent the lifting of the pole of the vehicle as the supply of spraying liquid is reduced and the proper balance of the machine is disturbed. This object I attain in the manner hereinafter set forth, reference being had to the accompanying drawing, in which—

Figure 1 is a view, partly in longitudinal section and partly in elevation, of sufficient of a spraying machine to illustrate my invention, and Fig. 2 is a plan or top view of that portion of the machine to which my invention particularly relates.

Spraying machines of this type are usually mounted upon two wheels, the frame 1 being mounted upon the axle 2 and carrying at the rear of said axle the spraying devices 3 and in front of said axle the tank 4 for the liquid with which the spraying devices are supplied, said tank when full or nearly full counterbalancing the weight of the spraying devices and also that of the driver of the machine, when he sits at the rear, and thus insuring the proper equilibrium of the frame 1. After the machine has been in operation some time, however, and the volume of liquid in the tank 4 is materially reduced, the weight at the rear of the frame overbalances the weight of the tank 4 and its contents and this causes the pole 5 of the vehicle, which is attached to the frame 1, to rise and thus interfere with the proper working of the draft team, and the proper relation of the spraying devices to the foliage. In order to overcome this objection I mount a weight 6 upon the pole so that it can be movable freely to-and-fro on the same and I connect the opposite ends of this weight by means of a rope, cord, or wire 7 (hereinafter, for convenience, termed a "rope") to a windlass 8 suitably mounted upon the machine so that its handle 9 is within convenient reach of the driver, the rope 7 being wound upon the drum or barrel of the windlass, and the right hand end of the rope passing around suitable guide pulleys 10 to the inner end of the weight 6 while the left hand end of the rope passes around similar guide pulleys 11 and around a sheave carried by a swinging hanger 12 at the front of the pole and thence to the front end of the weight, whereby, when the windlass 8 is turned in one direction, the weight can be drawn outwardly along the pole, and, when it is turned in the opposite direction, said weight can be drawn inwardly along the pole. As the machine operates and the weight of the tank 4 is lessened by the gradual withdrawal of the spraying liquid from the tank, the windlass 8 is operated so as to advance the weight 6 along the pole 5 and thus cause said weight to act with constantly increasing leverage to maintain the pole in its proper position. If the disposition of the weights upon the frame of the machine is such as to cause a reverse action to that described the adjustment of the weight may also be reversed so as to counterbalance the frame and its load.

Other means of advancing the weight 6 along the pole 5 may be adopted within the scope of my invention but I prefer the rope and windlass device which I have shown because of its convenience and because it serves to retain the weight in any position upon the pole to which it has been adjusted until further adjustment of the same becomes necessary.

I claim:

The combination of the frame of a plant spraying machine with the draft pole and a weight adjustable fore and aft along the same, a windlass and a rope wound thereon and having one end extending from one side of the windlass to the rear of the weight and the other end extending from the opposite side of the windlass around a sheave at the forward end of the pole and thence to the front of the weight.

In testimony whereof, I have signed my name to this specification, in the presence of two subscribing witnesses.

LEWIS ALBERT HART.

Witnesses:
KATE A. BEADLE,
HAMILTON D. TURNER.

Copies of this patent may be obtained for five cents each, by addressing the "Commissioner of Patents, Washington, D. C."